Patented May 24, 1938

2,118,679

UNITED STATES PATENT OFFICE 2,118,679

WELDING ROD

Arthur R. Lytle, Niagara Falls, N. Y., assignor to Oxweld Acetylene Company, a corporation of West Virginia No Drawing. Application July 16, 1936, Serial No. 90,886

3 Claims. (Cl. 219—8)

The invention relates to welding rods, and in particular to a steel welding rod of novel composition especially adapted for use in high speed welding operations of the continuous type.

In ordinary welding operations of the discontinuous type, such as the usual hand-welding technique, the weld is formed by the deposition and coalescence of a series of successive puddles of molten metal along the line of the weld. In this type of welding the operator has a high degree of control over the metal temperature and can "puddle" the molten metal to produce a clean, sound weld. Modern high speed welding technique, on the other hand, calls for steady continuous progression of the welding action along the line of the weld, with no manipulative "puddling" or the like to control the quality of the weld. This high speed continuous welding technique requires that the molten weld metal be heated to a higher temperature than is customary in ordinary welding technique, in order to secure sufficient penetration of the weld metal for the full depth of the weld, and this higher temperature, coupled with the lack of manipulative control previously alluded to, and the rapid chilling of the weld metal from a comparatively high temperature, leads to difficulties which it is the object of the present invention to overcome.

Experience has shown that the best combination of flowing characteristics and physical properties of steel weld metal is obtained with welding rods containing over 0.20% silicon, and such welding rods will hereinafter be referred to as silicon-bearing welding rods. For high speed welding operations it has been found desirable to use welding rods containing up to about 1% silicon, a silicon content of between about 0.3% and about 0.7% being commonly employed. One of the functions of silicon in such welding rods is to impart to the molten weld metal a quality usually referred to as "creaminess" or "sluggishness", which in the case of high speed welding tends to offset the undesirably high degree of fluidity associated with high temperature of the molten weld metal.

In high speed continuous welding the comparatively high silicon content of the weld metal required to offset the fluidifying effect of high temperature, coupled with the more rapid freezing of the molten weld metal, tends to produce pin holes which seriously interfere with the soundness and strength of the weld produced.

I have discovered that this tendency of silicon-alloyed welding rod to produce unsound welds occurs only when the sulphur content of the rod exceeds a certain very small limit and that a higher sulphur content is the principal contributory factor in causing porous welds. This phenomenon is illustrated by the following tabulation of data covering a large number of carefully controlled comparative tests of welding rods of various compositions. The steels of which these welding rods were composed, were prepared in the same furnace, and the welds were produced in the same automatic welding machine. In heats V and VI, letters A, B, etc., represent different ingots cast from the same heat of steel treated in the ladle to increase the sulphur content after the pouring of each ingot. Thus, sulphur was the only variable in the composition of the steels tested.

| Steel | Percent C | Percent Mn | Percent Si | Percent S | Percent P | Quality |
|---|---|---|---|---|---|---|
| I | 0.08 | 1.08 | 0.19 | 0.003 | 0.011 | Sound. |
| II | 0.05 | 0.93 | 0.20 | 0.033 | 0.007 | Porous. |
| III | 0.10 | 1.08 | 0.38 | 0.032 | 0.013 | Do. |
| IV | 0.05 | 1.08 | 0.29 | 0.002 | 0.021 | Sound. |
| V A | 0.06 | 1.00 | 0.22 | 0.008 | 0.16 | Do. |
| V B | 0.06 | 1.00 | 0.22 | 0.016 | 0.16 | Slight tendency toward porosity. |
| V C | 0.06 | 1.00 | 0.22 | 0.026 | 0.16 | Porous. |
| V D | 0.06 | 1.00 | 0.22 | 0.034 | 0.16 | Do. |
| VI A | 0.09 | 1.31 | 0.29 | 0.008 | 0.016 | Sound. |
| VI B | 0.09 | 1.23 | 0.25 | 0.047 | 0.014 | Porous. |
| VII | 0.13 | 1.37 | 0.55 | 0.003 | 0.017 | Sound. |
| VIII | 0.08 | 1.22 | 0.38 | 0.004 | 0.020 | Do. |
| IX | 0.15 | 1.15 | 0.31 | 0.002 | 0.002 | Cr 0.56 sound. |
| X | 0.12 | 1.16 | 0.40 | 0.002 | 0.001 | Cr 0.58 sound. |

It will be observed that, regardless of the carbon, manganese, or phosphorus contents of these steels, within the ranges shown, porosity developed only when the sulphur content was greater than about 0.015%, and that all welds made with steel of lower sulphur content were sound.

There is disclosed in my United States patent application Serial No. 90,885, filed July 16, 1936, a steel welding rod composition which may be described as a modification of the hereinbefore described welding rods containing silicon and manganese, the modification taking the form of additions of chromium or vanadium or both as an additional means of controlling fluidity of the weld metal. As described in my said application Serial No. 90,885, in order to produce a fusible slag covering the surface of the molten weld metal, and to enhance the physical properties of the weld, manganese is frequently added to such silicon-bearing welding rods in amounts ranging from about 0.7% to 1.5%, a manganese content of 1.1% to 1.2% being commonly employed. It has been found, however, that manganese exerts upon the molten weld metal a fluidifying effect which tends to offset the desirable effect of silicon upon the flowing properties of the weld metal.

I have found that chromium and vanadium, when added in suitable amounts to welding rods of the type described, tend to offset the fluidifying effect of manganese upon the weld metal and thereby permit a desirable degree of control over the flowing properties of the weld metal. For example, additions of chromium in amounts between about 0.2% and 1%, or of vanadium in amounts between about 0.1% and 0.6%, permit the use of up to 1.5% manganese in silicon-bearing steel welding rods without producing a weld metal which is too fluid at welding temperatures customary in high speed continuous welding technique. The resultant increase in the useful range of manganese content from about 1.2% to about 1.5% is desirable in order that a reasonably broad range of manganese content in the welding rod may be permitted, and in order to obtain welds of the highest quality. While chromium and vanadium may be usefully employed in silicon-bearing welding rods within the range previously stated, I have found that in general it is not necessary to use more than about 0.5% chromium or vanadium, or mixtures thereof. The silicon-sulfur relationship claimed in the present invention is useful in all such welding rods, whether or not they contain substantial proportions of manganese, and presumably it is broadly useful in steel welding rods within the usual range of ordinary alloying ingredients. Accordingly, the invention comprises steel welding rods generally, having a substantial silicon content in association with a very low maximum sulfur content.

I claim:

1. A steel welding rod producing sound, strong welds in high speed continuous fusion deposition welding operations without manipulative puddling, which rod contains essentially 0.2% to 1% silicon which promotes a desirable sluggishness of the molten weld metal but undesirably increases the effect of sulfur in producing porosity, said rod being substantially free from sulfur, the sulfur content being less than 0.015%, remainder substantially all iron.

2. A steel welding rod as defined in claim 1, containing 0.7% to 1.5% manganese which increases the soundness and strength of the deposited weld metal.

3. A steel welding rod as defined in claim 1, containing 1% to 1.4% manganese which increases the soundness and strength of the deposited weld metal.

ARTHUR R. LYTLE.